United States Patent

Gorkiewicz et al.

[15] 3,704,936
[45] Dec. 5, 1972

[54] ACHROMATIC DEPTH-OF-FIELD CORRECTION FOR OFF-AXIS OPTICAL SYSTEM

[72] Inventors: Walter Joseph Gorkiewicz, New York, N.Y.; John A. van Raalte, Princeton, N.J.

[73] Assignee: RCA Corporation

[22] Filed: March 9, 1970

[21] Appl. No.: 17,671

[52] U.S. Cl. ...............350/161, 350/182, 350/204, 353/69, 353/81
[51] Int. Cl. ......G02f 1/28, G02b 13/10, G03b 21/00
[58] Field of Search......350/161, 168, 202, 182, 286, 350/204; 353/69, 70, 81, 65–67, 33

[56] References Cited

UNITED STATES PATENTS

| | | | |
|---|---|---|---|
| 2,510,846 | 6/1950 | Wikkenhauser | 350/161 X |
| 3,527,522 | 9/1970 | Baumgartner | 350/161 |
| 2,338,488 | 1/1944 | Brown | 350/202 |
| 3,200,250 | 8/1965 | Bouwers | 350/182 X |
| 2,647,437 | 8/1953 | Bentley et al. | 353/67 X |

*Primary Examiner*—Ronald L. Wibert
*Assistant Examiner*—V. P. McGraw
*Attorney*—Eugene M. Whitacre

[57] ABSTRACT

Unmodulated, collimated white light is angularly directed to a target reflecting surface which is deformable to represent a subject, and the subject-modulated light reflected from the target surface is directed to a viewing screen by a schlieren optical system including a projection lens and a stop at the focal point of the lens. A prism is located adjacent the real subject-bearing target surface for rendering the apparent target surface parallel, and the light reflected therefrom orthogonal, to the principal plane of the lens and the screen; and for so reducing any color dispersion of the reflected light as to obtain adequate resolution of the image of the subject projected onto the screen.

9 Claims, 4 Drawing Figures

INVENTORS
WALTER JOSEPH GORKIEWICZ &
JOHN A. VAN RAALTE

Attorney

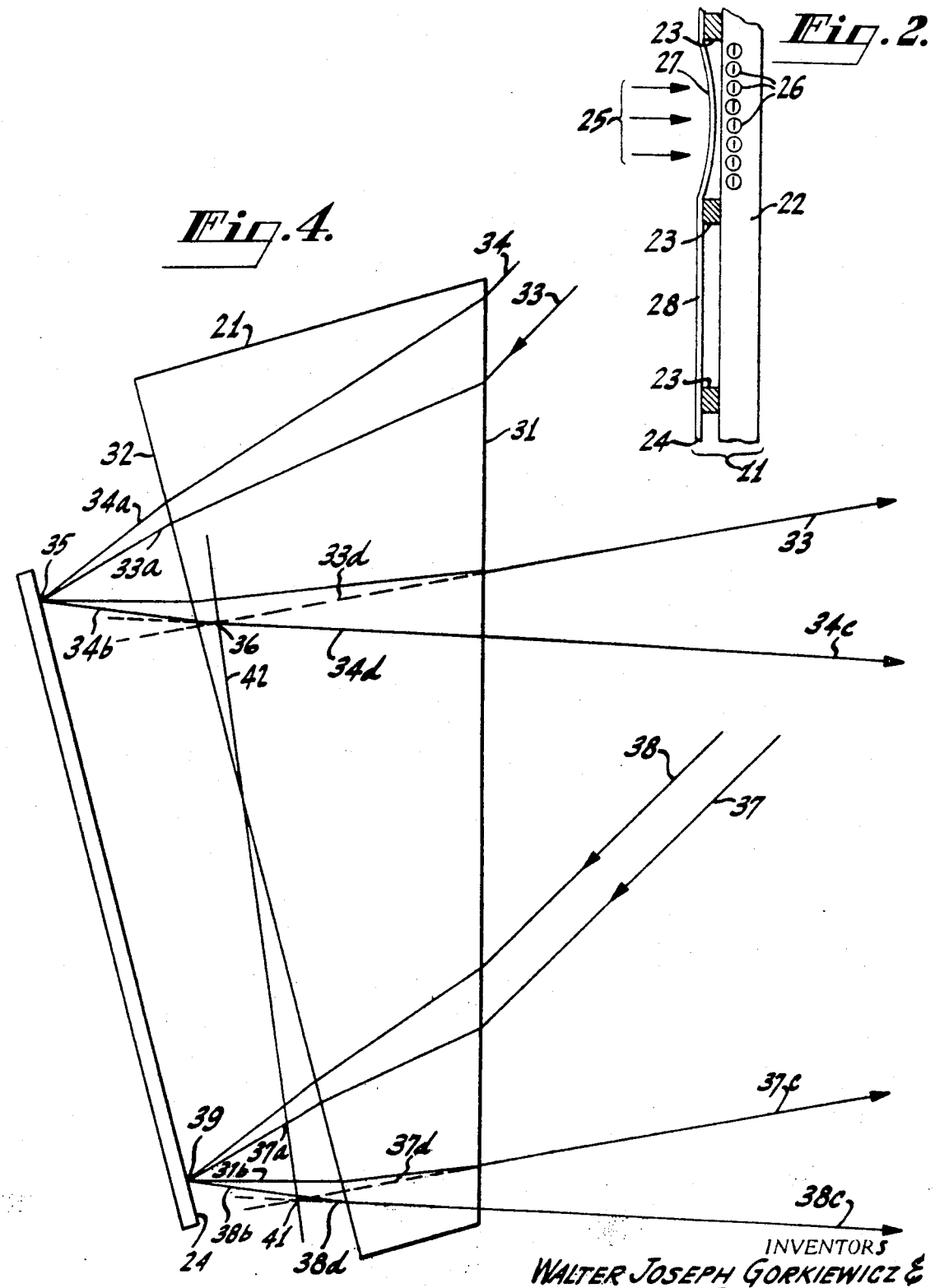

ACHROMATIC DEPTH-OF-FIELD CORRECTION FOR OFF-AXIS OPTICAL SYSTEM

At present, bright television images are best produced by projecting onto a viewing screen light modulated by a light valve to represent a subject. One such light valve is a multi-faceted light-reflecting film which is used in a schlieren type of optical projection system. In such a system either one of two general arrangements has been employed. In one arrangement a single lens has been used to perform (1) the function of collimating the light from a source which is directed onto the subject-bearing film which is deformed to a small degree and in different amounts to reflectively deviate the impinging light rays so as to represent the subject and (2) the function of projecting the reflected light toward the viewing screen. In such an arrangement a stop is placed at the focal point of the lens so as to prevent any undeviated reflected light rays received from the subject-bearing film from reaching the screen. While, in this arrangement, the principal reflected light rays are substantially orthogonal to the principal plane of the lens and to the screen and the definition of the projected image is satisfactory, the contrast of the image tends to be undesirably reduced by unwanted light which is reflected toward the screen by the single lens serving both as collimator and as projector.

In the other previously used general arrangement separate collimator and projector lenses have been employed. In this type of arrangement the collimated and projected light beams necessarily are at angles to the reflecting surface which is deformed to represent the subject. While such an arrangement can produce a projected image having relatively high contrast, it is one in which the image field undesirably deviates from orthogonality to the axis of the imaging light beam which produces a depth-of-error. Such an error is manifested by an inability to project the image onto the screen with all parts of it in good focus. For example, such systems may be adjusted so that a central band of the projected image is in good focus on the viewing screen but the top and bottom portions of the image will be out of focus. Hence, the simultaneous requirements of satisfactory imaging of the light source on the schlieren stop and of producing good quality (i.e., low aberrations) of the image projected onto the viewing screen can only be satisfied for relatively small optical apertures and, consequently, the projected image will have an unsatisfactorily low brightness.

The use of relatively large optical apertures in a two-lens system causes a deviation from orthogonality of the reflected light rays on the screen which produces a keystone distortion of the image and a degrading variation of the resolution of the projected image. Heretofore, various measures have been adopted to mitigate to some degree one or both of such defects. One expedient was to predistort the dimensions of the image to be projected so as to compensate for the expected keystoning. Such an approach requires circuit modifications which not only add to the cost of the equipment but also produce other undesired image degradation. Another technique which has been employed is to effect the compensation by means of a fiber-optic combination prism. Such apparatus necessarily is quite complicated and cumbersome in addition to being costly. A third suggested compensation device is that disclosed in U.S. Pat. 3,249,004 issued May 3, 1966 to O. A. Ullrich which comprises two glass blocks located in the projected light path and serving to produce a rough depth-of-field compensation. Not only is the compensation afforded by such means too crude for the relatively high degree of resolution needed for the projection of good quality television images but also unwanted lines, produced by the junction of one block with another, may appear in the image projected onto the viewing screen.

It is an object of this invention, therefore, to provide simple and inexpensive means for effecting depth-of-field correction in an off-axis optical projection system which has none of the deficiencies of the prior art compensators of the character described and which is substantially achromatic.

The present invention is an optical system embodying the general concept of depth-of-field correction taught in a concurrently filed application of Edward G. Ramberg, Ser. No. 17,412 and entitled Optical System for Orthogonalizing Image Field of Projection Lens. In Ramberg the desired depth-of-field correction is achieved by the application of the general concept of placing a prism in the path of the light reflected from a subject. The particular application, employed by Ramberg, of such general concept is that of a prism placement adjacent the principal plane of the projecting lens so as to affect substantially only the subject-reflected light. For monochromatic illumination of the reflecting subject a simple, relatively inexpensive prism located near the projecting lens functions satisfactorily. For polychromatic, such as white, light subject illumination, however, Ramberg teaches that a prism located near the projecting lens needs to be one capable of correcting color errors. Such a prism necessarily is relatively complex and, hence, expensive.

The off-axis optical projection system embodying the present invention and following the broad teaching of Ramberg comprises means for angularly directing a beam of unmodulated, collimated white light onto a light-reflective surface on which is recorded a subject, an image of which is produced on a viewing screen by light-projecting means having its principal plane substantially parallel to the screen and which receives subject-modulated light angularly reflected from the subject-bearing surface. The projection system also includes a prism located adjacent the subject-bearing surface so that it is in the paths of both the modulated, collimated light beam and the subject-modulated, reflected light beam, the prism having such configuration, refractive index and orientation relative to the real subject-bearing surface as to render the apparent subject-bearing surface parallel, and the light reflected therefrom orthogonal, to the principal plane of the light-projecting means and to the viewing screen; and for so reducing any color dispersion of the reflected light as to obtain satisfactory resolution of the image of the subject projected onto the screen.

For illustrative purposed the invention, while not necessarily limited thereto, is embodied in a schlieren type of projection system in which the collimated white light is directed by means including a collimating lens to a reflecting surface on which the subject is recorded as deformations of the surface. The subject-modulated light reflected from the deformable surface is directed by a projection lens toward the viewing screen and the depth-offield correcting orthogonalizing prism is mounted sufficiently close to the subject-bearing reflecting surface that whatever color dispersion may be produced by the prism is so small that the resolution of the projected image is not adversely affected to a significant degree.

For a more specific disclosure of the invention and its mode of operation reference may be had to the following detailed description of an illustrative embodiment thereof which is given in conjunction with the accompanying drawings, of which:

FIG. 2 is a fragmentary view, to a grossly enlarged scale, of an electrode of the system of FIG. 1 on which the subject whose image is to be projected may be recorded;

Figure 3:
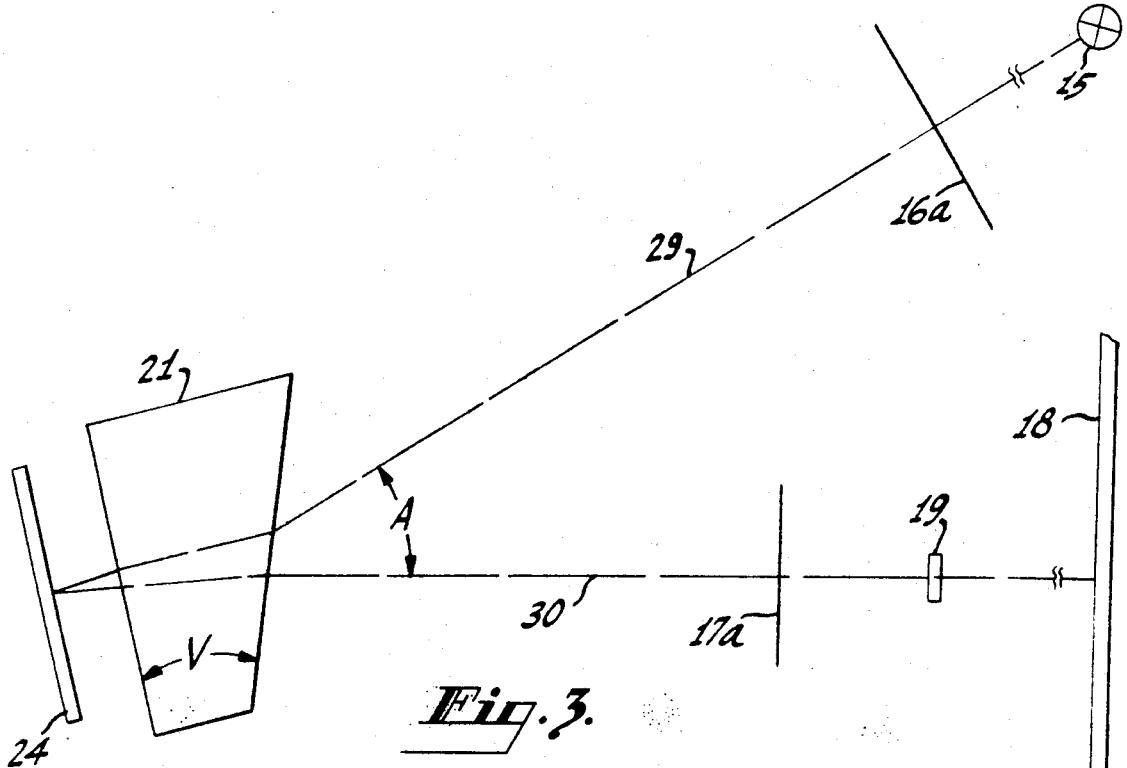

FIG. 3 is a diagrammatic representation of the operation of the optical system embodying the invention; and FIG. 4 is a diagrammatic representation, to a grossly enlarged scale, of the operation of the optical system of the invention for typical component color rays of the white light used in the system, showing the insignificantly small amount of color dispersion that the orthogonalizing prism tends to produce.

Figure 1:
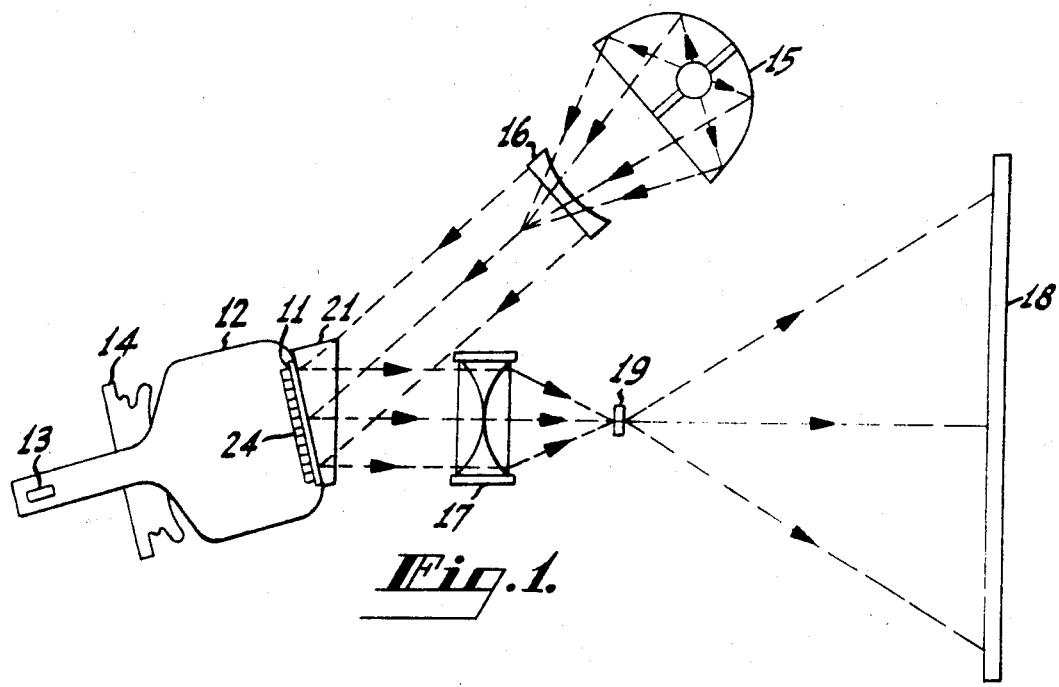
FIG. 1 is a diagrammatic representation of one type of image projection system in which the apparatus of the invention may be used.

FIG. 1 shows a general type of image formation and projection system in which the invention may be used. In this case the subject, representing the image to be projected, is formed on a light-reflecting target electrode 11 of a cathode ray tube 12 by a video signal-modulated electron beam produced by a gun 13 and deflected over the target electrode by means including a deflection yoke 14 energized in a conventional manner to scan a raster at the electrode 11. White light from a source 15 is directed by means including a collimating lens 16 at an angle to the surface of the target electrode 11 from which it is reflected in image-representative form and directed by means including a projecting lens 17 to a viewing screen 18. The particular image-projecting system shown to illustrate the invention is of the schlieren type which has a stop 19 located substantially at the focal point of the projecting lens 17. A depth-of-field correcting orthogonalizing prism 21 is mounted adjacent the target electrode 11 in front of the faceplate of the cathode ray tube 12 so that it is in the paths of both the collimated light and the subject-modulated light reflected from the target electrode.

The target electrode 11 of the cathode ray tube 12 is effectively a part of a light valve of the type disclosed in a copending application of John A. van Raalte and Victor Christiano, Ser. No. 861,592, filed Sept. 29, 1969 and entitled Intelligence-Handling Device Having Means for Limiting Induced Electrostatic Potential. Essentially, as shown in FIG. 2, the target electrode 11 comprises an insulating substrate 22, such as glass (which conveniently may be the faceplate of the cathode ray tube) on one plane surface of which there is a plurality of supporting conductors 23 which are electrically connected together (not shown). The spacing between adjacent conductors corresponds to the dimensions of an elemental area of the subject to be effectively recorded on the electrode. The conductors 23 support, in spaced relation to the substrate 22, a light-reflective, electrostatically deformable, normally flat metal film 24 which may be made of alloys of metals such as nickel, copper or aluminum, for example. The film 24 is sufficiently thin to be pervious to an electron beam 25 so that pattern of electrical charges 26 may be produced on the insulating substrate 22, the particular pattern being determined by the intensity of the video signal modulation of the electron beam. The electrostatic potential so produced between the film 24 and the substrate 22 effects a local deformation of an elemental area 27 of the film 24. An elemental area 28 of the film 24 behind which no electrical charges are produced on the insulating substrate 22 remains flat and undeformed.

Again referring to FIG. 1, any light which is reflected from an undeformed elemental area of the metal film 24 of the target electrode 11 of the cathode ray tube 12 is intercepted by the schlieren stop 19 and, hence, does not reach the screen 18, thereby producing a dark spot at that part of the projected image corresponding in location to hat of the undeformed part of the target electrode film. At least some of the light which is reflected from a deformed area of the target electrode film, however, is not intercepted by the stop 19 and, hence, does reach the screen 18 to produce light of an intensity depending upon the amount of film deformation at the part of the projected image which corresponds to the location of the deformed area of the film in the recorded subject. The more intense the electron beam is at a given elemental area of the film the greater will be the film deformation and the greater amount of the light from the source 15 that will be reflected to the screen 18. In this way a reproduction of the subject recorded at the target electrode 11 of the cathode ray tube 12 is projected onto the viewing screen 18. As previously stated, however, such a reproduction will be subject to such deficiencies as unsatisfactorily low brightness, keystone distortion and the like unless steps, such as the use of the prism 21 embodied in this invention, are taken to compensate for the necessarily non-orthogonality of the reflected light rays relative to the principal plane of the projecting lens 17.

The FIG. 3 diagrammatic representation of the optical axes of the system embodying the invention illustrates the manner in which the prism 21 functions to effect the desired depth-of-field correction. In the figure the lenses 16 and 17 of FIG. 1 are represented as having respective principal planes 16a and 17a and optical axes 29 and 30. The optical axis 29 of the collimating lens 16 is that along which unmodulated white light derived from the source 15 enters the front surface 31 of the prism 21 and from which, after refraction, it emerges from the rear prism surface 32 along the axial line 29a. The subject-modulated light reflected from the target film 24 follows the axial line 30a and enters the prism 21 at its rear surface 32 to emerge from its front surface 31, after refraction, along the optical axis 30 of the projecting lens 17. The subject-modulated light, thus, is directed substantially orthogonally to the principal plane 17a of the projecting lens and to the screen 18 as if it had been reflected from an apparent target film surface 24a along a rearward extension 30b of the optical axis of the projecting lens. In one successfully operated embodiment of the invention the prism 21 was trapezoidal in shape, having an apex angle V of about 15°, and the angle A between the optical axes 29 and 30 was approximately 30°. In the depth-of-field correction system of the invention, however, the subject-modulated white light directed along the optical axis 30 of the projecting lens 17 is subject to a slight color dispersion produced by the orthogonalizing prism 21.

FIG. 4 illustrates such color dispersion and the manner in which it is so reduced, by the location of the prism 21 adjacent the reflecting target film 24, as to have substantially no significant adverse effect upon the resolution of the image projected onto the viewing screen 18. In the following description the red and blue components of typical rays of the collimated white light directed toward the prism and the film will be considered as representing opposite ends of the visible white light spectrum. Red and blue ray components 33 and 34, respectively, which are substantially parallel as they impinge upon the front surface 31 of the prism 21, emerge from the rear prism surface 32 as red and blue components 33a and 34a and converge at the same point 35 on the film 24 because the refraction by the prism is less for the red component 33 than it is for the blue component 34. The reflected red and blue components 33b and 34b emerge from the front surface 31 of the prism 21 as diverging red and blue ray components 33c and 34c, respectively, because of the color dispersion of the prism for such rays of different wavelengths.

By extending the paths of the emerging red and blue ray components 33c and 34c backwards toward the reflecting film 24 as imaginary ray components 33d and 34d it is seen that they apparently converge at a point 36 which is within and adjacent the rear surface 32 of the prism 21. Two other red and blue ray components 37 and 38 which impinge upon the front surface 31 of the prism 21 emerge from the rear surface 32 as ray components 37a and 38a and converge at a point 39 on the film 24 from which they are reflected as ray components 37b and 38b and emerge from the front prism surface 31 as diverging red and blue ray components 37c and 38c respectively. A backward extension toward the film 24 of these diverging ray components as imaginary ray components 37d and 38d indicates their apparent convergence at a point 41 outside the prism 21 and adjacent the rear surface 32. The two points 36 and 41 effectively define the "color-divergence" plane 42 of the prism from which ray components of all colors emerging from the front surface 31 of the prism 21 appear to diverge. The amount of such divergence depends upon the color (i.e., wavelength) of the ray component, the described red and blue ray components representing the maximum divergence to be experienced in practice. It is evident, from a consideration of FIG. 4, that the color-divergence plane 42 and, hence, the prism 21 should lie as closely as possible to the film 24 in order to reduce to an insignificant degree any color defects in the projected image arising from the color dispersion produced by the prism 21.

Although the main purpose in locating the prism 21 close to the subject-bearing surface 24 is to effect the desired depth-of-field correction by orthogonalizing the subject-modulated light relative to the projecting lens 17 with an insignificant amount of color dispersion, it was found that such a prism location also improved the resolution of the image projected onto the viewing screen 18. The best image resolution is obtained by orienting the prism 21 so that its rear surface 32 is substantially parallel to the subject-bearing surface 24. Such an orientation may, however, result in some loss of contrast in the projected image, caused by undesired reflections, but it may be reduced by placing the prism 21 so that its rear surface 32 is at a small angle (e.g., 2° or 3° relative to the subject-bearing surface 24. The placement of the prism 21 close to the subject-bearing surface 24 in accordance with the invention enables the use for the prism of simple, easily obtained and relatively inexpensive materials such as lucite, ordinary crown glass and the like having an index of refraction of approximately 1.5, even though such materials have relatively high color dispersion constants. The present invention is applicable to any off-axis optical projection system but when it is used with a cathode ray tube type of light valve, such as that shown in FIGS. 1 and 2, the prism 21 may advantageously be cemented to the faceplate of the tube, particularly when the faceplate serves as the substrate of the light valve. In this way there may be achieved a sufficiently close placement of the color-divergence plane 42 (FIG. 4) of the prism relative to the subject-bearing film 24 to still further reduce any color dispersion to an absolute minimum.

What is claimed is:

1. An optical system for projecting an image of a light-reflective subject having an effective principal plane onto a viewing screen, comprising:

means for directing a beam of unmodulated, collimated white light onto said subject, said directing means having an optical axis nonorthogonally disposed relative to the effective principal plane of said subject:

light-projecting means, including a lens having its principal plane substantially parallel to the plane of said screen and angularly disposed relative to the effective principal plane of said subject, for receiving subject-modulated light reflected from said subject and directing it toward said screen; and means for substantially achromatically orthogonalizing said subject-modulated light relative to the principal plane of said light-projecting lens, said orthogonalizing means comprising a prism located adjacent said subject in the paths of both said beam of unmodulated, collimated white light and said subject-modulated light, said prism having a rear planar surface closely adjacent to said subject and oriented to be angularly disposed relative to the principal plane of said light-projecting lens, and a front planar surface angularly disposed relative to the principal plane of said light-projecting lens as well as angularly disposed relative to the plane of said rear prism surface, the planes of said front and rear prism surfaces converging at a location on the opposite side of the optical axis of said light-projecting lens from the location of the optical axis of said unmodulated light directing means.

2. An optical system as defined in claim 1, said prism location placing the effective color-divergence plane for differently colored light ray components emerging from the front prism surface closely adjacent said subject and remote from said principal plane of said light-projecting means.

3. An optical system as defined in claim 2, said subject being recorded on a deformable film; and said light-projecting means being of the schlieren type having a stop located at the focal point of said light-projecting lens.

4. An optical system as defined in claim 3, said deformable film being a thin metallic sheet supported in spaced relation to an insulator substrate and constituting an element of a light valve.

5. An optical system as defined in claim 4, said light valve comprising a cathode ray tube having an envelope including a transparent faceplate enclosing one end of said tube; and an electron gun mounted within said envelope at its other end, said substrate-supported deformable metallic sheet being mounted adjacent said faceplate and constituting a target electrode for said electron gun.

6. An optical system as defined in claim 5, said prism being cemented to said cathode ray tube faceplate.

7. An optical system as defined in claim 6, said cathode ray tube faceplate constituting said insulator substrate of said target electrode.

8. An optical system as defined in claim 2, said prism being a single element device formed of a material having a relatively high color dispersion constant.

9. An optical system as defined in claim 8, said single element device having a trapezoidal cross-section, and said high color dispersion constant material having an index of refraction of the order of 1.5.

* * * * *